US005322865A

United States Patent [19]

Inoue et al.

[11] Patent Number: 5,322,865

[45] Date of Patent: Jun. 21, 1994

[54] AQUEOUS COLOR PAINT COMPOSITIONS AND COATING METHOD USING SAME

[75] Inventors: Hiroshi Inoue; Hiromi Harakawa; Akira Kasari; Kenya Suzuki; Yoshinori Kato, all of Hiratsuka, Japan

[73] Assignee: Kansai Paint Co., Ltd., Hyogo, Japan

[21] Appl. No.: 10,397

[22] Filed: Jan. 28, 1993

[30] Foreign Application Priority Data

Jan. 29, 1992 [JP] Japan .................................. 4-040109

[51] Int. Cl.$^5$ ...................... C08L 67/06; C08L 33/08; C08L 33/10; C08F 2/22

[52] U.S. Cl. .................................... 523/501; 524/457; 524/458; 524/501; 524/512; 524/513

[58] Field of Search ................ 523/501; 524/457, 458, 524/501, 513, 512

[56] References Cited

U.S. PATENT DOCUMENTS

| | | | |
|---|---|---|---|
| 4,403,003 | 9/1983 | Backhouse | 427/407.1 |
| 4,414,357 | 11/1983 | Wright et al. | 524/513 |
| 4,459,379 | 7/1984 | Schwarz | 523/501 |
| 4,504,609 | 3/1985 | Kuwajima et al. | 524/501 |
| 4,518,724 | 5/1985 | Kuwajima et al. | 524/458 |
| 4,539,363 | 9/1985 | Backhouse | 524/460 |
| 4,900,774 | 2/1990 | Mitsuji et al. | 524/512 |
| 4,952,626 | 8/1990 | Kordomenos et al. | 525/28 |

FOREIGN PATENT DOCUMENTS

| | | | |
|---|---|---|---|
| 0072979 | 3/1983 | European Pat. Off. | |
| 0291271 | 10/1990 | European Pat. Off. | |
| 0207654 | 12/1982 | Japan | 524/513 |
| 0127363 | 1/1987 | Japan | 524/512 |
| 2131437 | 6/1984 | United Kingdom | |

*Primary Examiner*—Paul R. Michl

*Assistant Examiner*—Peter Szekely

*Attorney, Agent, or Firm*—Wenderoth, Lind & Ponack

[57] ABSTRACT

An aqueous color paint composition comprising (I) an aqueous dispersion of acrylic polymer fine particles, (II) a modified polyester resin aqueous dispersion obtained by neutralizing, with a basic substance, a modified polyester resin formed by polymerizing (A) a radical-polymerizable unsaturated group-containing polyester resin and (B) a mixture of an ethylenically unsaturated carboxylic acid and another copolymerizable unsaturated monomer and having an acid value of 8 to 200 and a hydroxyl value of 30 to 300, and dispersing the resulting resin in an aqueous dispersion medium, (III) a crosslinking agent, and (IV) a color pigment.

The composition is, even if high-solid, good in coatability and excellent in smoothness of the coated film. It is therefore quite suitable as a high-solid base coat composition when coating an outside plate, etc. of automobiles, two-wheelers, electric appliances, etc. requiring beautiful appearance.

20 Claims, No Drawings

AQUEOUS COLOR PAINT COMPOSITIONS AND COATING METHOD USING SAME

This invention relates to an aqueous color paint composition and a coating method using same.

As a method for forming a topcoat in which first a color base coat and then a clear topcoat are coated, especially as a method for forming a topcoat on an automobile outside plate, there is mainly what is called a two-coat one-bake method in which a metallic base coat is formed, a clear topcoat is coated on the uncured metallic base coat and both coats are heat-cured at the same time. As the metallic base coat used in this method, an organic solvent-type paint of an acrylic resin/melamine resin type or a polyester resin/melamine resin type has been currently used in many cases, giving rise to a problem that a large amount of an organic solvent is generated in coating and baking. Accordingly, it has been demanded that an aqueous metallic base coat having a low content of the organic solvent is put to practical use from the aspects of energy saving, environmental pollution, safety, etc.

Heretofore, aqueous metallic base coat compositions have been indeed developed and put to practical use. For instance, an aqueous coating composition containing an aqueous dispersion of a water-dispersable acrylic polymer and a specific hydrophobic melamine resin as a binder component (see U.S. Pat. No. 4,900,774) and an aqueous coating composition in which pseudoplasticity or thixotropy is imparted to the overall paint with polymer fine particles obtained by dispersion-polymerizing a suitable acrylic monomer in an aqueous medium in the presence of a steric stabilizer being a specific dispersion stabilizer (see U.S. Pat. Nos. 4,539,363 and 4,403,003) have been proposed. In these instances, when the solids content in coating is low, e.g., 15 to 25% by weight, the coating finish is good without any problem. However, when the solids content in coating is relatively high, e.g., 25 to 40% by weight to meet a recent demand for being high-solid in the technical field concerned, the finishing property of the coated film, especially smoothness of the coated film after heat-cured, is poor.

Further, the aqueous coating composition suffers problems that it is liable to cause coating defects such as sagging, unevenness, etc. due to coating conditions, especially change in humidity and properties of the coated film, such as chipping resistance and non-sand recoatability are not enough.

The present inventors have made extensive investigations to solve the aforesaid problems, and have consequently found that the above problems can be solved by a paint composition containing as a basic resin a combination of an aqueous dispersion of acrylic polymer fine particles used previously and an aqueous dispersion of a specific modified polyester resin. This finding has led to perfection of this invention.

Thus, according to this invention, there is provided an aqueous color paint composition comprising (I) an aqueous dispersion of acrylic polymer fine particles, (II) a modified polyester resin aqueous dispersion obtained by neutralizing with a basic substance a modified polyester resin formed by polymerizing (A) a radical-polymerizable unsaturated group-containing polyester resin and (B) a mixture of an ethylenically unsaturated carboxylic acid and another copolymerizable unsaturated monomer and having an acid value of 8 to 200 and a hydroxyl value of 30 to 300, and dispersing the resulting resin in an aqueous dispersion medium, (III) a crosslinking agent, and (IV) a color pigment, and a two-coat one-bake coating method characterized by using the aqueous color paint composition as a base coat composition.

This invention will be described in more detail below.

AQUEOUS DISPERSION (I) OF ACRYLIC POLYMER FINE PARTICLES

The aqueous dispersion (I) of acrylic polymer fine particles used in the aqueous color paint composition of this invention can be those known per se, described in, for example, said U.S. Pat. Nos. 4,900,774 and 4,539,363. An example of such an aqueous dispersion is an aqueous dispersion of acrylic polymer fine particles formed by polymerizing at least one acrylic monomer and, if required, another copolymerizable monomer in the presence of a nonionic surface active agent such as polyoxyethylenenonylphenyl ether, an anionic surface active agent such as polyoxyethylenealkylallyl ether sulfuric acid ester, and a dispersion stabilizer such as a water-soluble resin having an acid value of about 20 to 150 and a number average molecular weight of about 5,000 to 30,000, for example, an acrylic resin, said particles having an average particle size of usually about 0.02 to about 1 micrometer, especially 0.03 to 0.5 micrometer.

Examples of the acrylic monomer subjected to polymerization are (meth)acrylic acid; carboxyalkyl (meth)acrylates such as 2-carboxyethyl (meth)acrylate; alkyl (meth)acrylates such as methyl (meth)acrylate, ethyl (meth)acrylate, propyl (meth) acrylate, n-butyl (meth)acrylate, isobutyl (meth)acrylate and 2-ethylhexyl (meth)acrylate; hydroxyalkyl (meth)acrylates such as hydroxyethyl (meth)acrylate, hydroxypropyl (meth)acrylate and hydroxybutyl (meth)acrylate; (meth)acrylamides such as (meth)acrylamide, N-propoxymethyl (meth)acrylamide and N-butoxymethyl (meth)acrylamide; and glycidyl (meth)acrylate. They may be used either singly or in combination.

Examples of the other monomer copolymerizable with the acrylic monomer are alpha.beta-ethylenically unsaturated carboxylic acids such as maleic acid, fumaric acid, itaconic acid and a half ester of maleic acid or fumaric acid, vinyl aromatic compounds such as styrene, vinyltoluene and alpha-methylstyrene, vinyl acetate, and (meth)acrylonitrile.

Moreover, a polyfunctional monomer can conjointly be used in a small amount, if required, to crosslink the formed polymer fine particles. Examples of the polyfunctional monomer are divinylbenzene, ethylene glycol di(meth)acrylate, 1,6-hexane di(meth)acrylate, trimethylolpropane di(meth)acrylate, allyl (meth)acrylate, and triacrylic acid trimethylolpropane.

As the aqueous dispersion (I) of acrylic polymer fine particles used in this invention, an aqueous dispersion prepared by a multistage polymerization method is also available. For example, a multistage polymerization emulsion formed by first emulsion-polymerizing the above acrylic monomer not containing or containing a small amount of an alpha.beta-ethylenically unsaturated acid, and then copolymerizing an acrylic monomer containing a large amount of an alpha.beta-ethylenically unsaturated acid is thickened by neutralization with a neutralizing agent, and is therefore desirable from the aspect of coatability. Examples of the neutralizing agent are ammonia and water-soluble amino compounds such as monoethanolamine, ethylamine, dimethylamine, diethylamine, triethylamine, propylamine, dipropylamine, isopropylamine, diisopropylamine, triethanolamine, butylamine, dibutylamine, 2-ethylhexylamine, ethylenediamine, propylenediamine, ethylethanolamine, dimethylethanolamine, diethylethanolamine, 2-amino-2-methylpropanol, and morpholine. Of these, triethylamine, dimethylethanolamine and 2-amino-2-methylpropanol are especially preferable.

In the aqueous dispersion (I) of acrylic polymer fine particles used in this invention, dispersed particles may be crosslinked when stress is laid upon properties such as mechanical stability, storage stability, etc. The crosslinking method can be a method known per se in which a polyfunctional monomer such as divinylbenzene or a monomer comprising a combination of (meth)acrylic acid and glycidyl (meth)acrylate is contained in a monomer component that forms particles.

Moreover, the acrylic polymer fine particles are themselves required to have good finish appearance, excellent water resistance, etc. of the coated film. Good finish appearance can be achieved by using a relatively large amount of an unsatuarted acid monomer such as (meth)acrylic acid. Moreover, the use of a long-chain alkyl ester of (meth)acrylic acid is useful to improve water resistance.

AQUEOUS DISPERSION (II) OF A MODIFIED POLYESTER RESIN

The modified polyester resin in the aqueous dispersion (II) of the modified polyester resin used in the aqueous color paint composition of this invention is a resin formed by polymerizing a radical-polymerizable unsaturated group-containing polyester resin (A) and a mixture (B) of an ethylenically unsaturated carboxylic acid and another copolymerizable unsaturated monomer and having an acid value of 8 to 200 and a hydroxyl value of 30 to 300.

The radical-polymerizable unsaturated group-containing polyester resin (A) can be obtained, for example, by reacting a carboxyl group and a hydroxyl group of a polyester resin with at least one monomer selected from (1) an epoxy group-containing radical-polymerizable unsaturated monomer, (2) an isocyanate group-containing radical-polymerizable unsaturated monomer and (3) an acid anhydride group-containing polymerizable unsaturated monomer such that the epoxy group, the isocyanate group and the acid anhydride group are substantially reacted.

The polyester resin containing the carboxyl group and the hydroxyl group can be formed, for example, by reacting a polybasic acid component containing two or more carboxyl groups in a molecule with a polyhydric alcohol component containing at least two hydroxyl groups in the molecule by a method known per se such that the polyester resin formed has the carboxyl group and the hydroxyl group. Examples of the polybasic acid component are phthalic acid, isophthalic acid, terephthalic acid, maleic acid, pyromellitic acid, adipic acid and cyclohexyldicarboxylic acid. Examples of the polyhdric alcohol component are (poly)ethylene glycol, (poly)propylene glycol, neopentyl glycol, 1,6-hexanediol, cyclohexyl dimethanol, trimethylolpropane, pentaerythritol, glycerol and tricyclodecane dimethanol. Further, the polyester resin may be modified. if required, with a fatty acid such as castor oil fatty acid, cocconut oil fatty acid or cotton seed fatty acid, or benzoic acid as part of the acid component.

The epoxy group-containing unsaturated monomer (1) capable of reacting with the polyester resin is a monomer containing one epoxy group and one radical-poly-merizable unsaturated group in the molecule. Examples of the epoxy group-containing unsaturated monomer (1) are glycidyl (meth)acrylate, allylglycidyl ether and 3,4-epoxycyclohexylmethyl (meth)acrylate.

The isocyanate group-containing unsaturated monomer (2) is a monomer containing one isocyanate group and one radical-polymerizable unsaturated group in the molecule. Examples of the isocyanate group-containing unsaturated monomer (2) are monoisocyanate compounds such as isocyanate ethyl (meth)acrylate and alpha,alpha-dimethyl-m-isopropenylbenzyl isocyanate; and a reaction product of 1 mol of a hydroxyl group-containing radical-polymerizable unsaturated monomer [e.g., hydroxyethyl (meth)acrylate and hydroxypropyl (meth)acrtlate] and 1 mol of a polyisocyanate compound [e.g., isophorone diisocyanate].

The acid anhydride group-containing unsaturated monomer (3) is a compound containing one acid anhydride group and one radical-polymerizable unsaturated group in the molecule. Examples of the acid anhydride group-containing unsaturated monomer (3) are unsaturated dicarboxylic acid anhydrides such as maleic anhydride, itaconic anhydride and succinic anhydride.

The proportion in which the above unsaturated monomers (1) to (3) are reacted with the polyester resin containing the carboxyl group and the hydroxyl group is not strictly limited and can properly be changed. It is usually 0.2 to 5 mols, preferably 0.3 to 3 mols per molecule of the polyester resin. The reaction can be conducted in a hydrophilic organic solvent at a temperature of usually about 80° to 150° C. for about 1 to 8 hours.

Examples of the hydrophilic solvent available in the above reaction are ethylene glycol, ethylene glycol monoalkyl ethers (e.g., methyl ether, ethyl ether and butyl ether), diethylene glycol, diethylene glycol monoalkyl ethers (e.g., diethylene glycol methyl ether, diethylene glycol ethyl ether and diethylene glycol butyl ether), glyme solvents (e g., ethylene glycol dimethyl ether), diglyme solvents (e.g., diethylene glycol dimethyl ether), alcohol solvents (e.g., methyl alcohol, ethyl alcohol, propyl alcohol and n-butyl alcohol), propylene glycol, propylene glycol monoalkyl ethers (e.g., propylene glycol methyl ether, propylene glycol ethyl ether and propylene glycol butyl ether), dipropylene glycol, and dipropylene glycol monoalkyl ethers (e.g., dipropylene glycol methyl ether, dipropylene glycol ethyl ether and dipropylene glycol butyl ether). They may be used either singly or in combination.

The above radical-polymerizable unsaturated group-containing polyester resin (A) is polymerized with the mixture (B) of the ethylenically unsaturated carboxylic acid and the other copolymerizable unsaturated monomer. Consequently, the modified polyester resin is finally formed wherein the polyester resin (A) is graft-polymerized with the monomer mixture (B) by the polymerization of the monomers of the monomer mixture (B) and the reaction of the monomers and/or the polymer of said monomers and the polyester resin (A).

The polymerization can be carried out by a solution polymerization method known per se in the presence of a suitable polymerization catalyst at a temperature of about 60° C. to about 150° C. using the above hydrophilic solvent.

The ratio of the reaction components (A) and (B) can vary over a wide range depending on properties, etc. required of the resulting modified polyester resin; the A/B weight ratio is usually 20/80 to 90/10, preferably 30/70 to 80/20.

The ratio of the ethylenically unsaturated carboxylic acid and the other copolymerizable unsaturated monomer in the component (B) depends on the acid value of the resulting modified polyester resin. The ethylenically unsaturated carboxylic acid/other copolymerizable unsaturated monomer weight ratio is usually 2/98 to 30/70, preferably 3/97 to 27/75.

Examples of the ethylenically unsaturated carboxylic acid used in the component (B) are (meth)acrylic acid, 2-carboxyethyl (meth)acrylic acid, maleic acid, fumaric acid, itaconic acid, and a half ester of maleic acid or fumaric acid. Of these, (meth)acrylic acid is preferable. The other copolymerizable unsaturated monomer can be the same as the acrylic resin and the other copolymerizable monomer shown in production of the aqueous dispersion (I) of the acrylic polymer fine particles. Preferable are for example, alkyl or cycloalkyl (meth)acrylates such as methyl (meth)acrylate, ethyl (meth)acrylate, propyl (meth)acrylate, butyl (meth)acrylate, hexyl (meth)acrylate, lauryl (meth)acrylate and cyclohexyl (meth)acrylate; vinyl aromatic compounds such as styrene and vinyl toluene; acrylonitrile-type compounds such as (meth)acrylonitrile; and hydroxyalkyl (meth)acrylates such as hydroxyethyl (meth)acrylate and hydroxypropyl (meth)acrylate. They may be used either singly or in combination.

When the proportion of the polyester resin (A) is less than 10% by weight in blending the polyester resin (A) with the monomer mixture (B), finishing property, chipping resistance and non-sand recoatability of the coated film tend to decrease. Meanwhile, when the proportion of the polyester resin (A) is more than 90% by weight, finish appearance and water resistance of the coated film tend to decrease. When the proportion of the ethylenically unsaturated carboxylic acid in the monomer mixture (B) is less than 2% by weight, there is a tendency that water dispersibility of the formed resin decreases and paint shelf stability becomes poor. On the other hand, when the proportion of the ethylenically unsaturated carboxylic acid exceeds 30% by weight, water resistance of the coated film tends to decrease.

The modified polyester resin of the aqueous dispersion (II) used in this invention can have an acid value of 8 to 200, preferably 8 to 150. Said modified polyester resin has to have a hydroxyl group for the crosslinking reaction with the crosslinking agent (III) which will be later described. The hydroxyl group may be either the hydroxyl group of the polyester resin (A) itself or introduced by using a hydroxyl group-containing unsaturated monomer as part of the monomers of the monomer mixture (B). The content of the hydroxyl group of the modified polyester resin is 30 to 300, preferably 40 to 200 in terms of the hydroxyl value. Moreover, the modified polyester resin can have a number average molecular weight of usually about 500 to 15,000, preferably 1,000 to 10,000.

The resulting modified polyester resin is water-dispersed as such or by evaporating the solvent to produce the aqueous dispersion (II) of the modified polyester resin. The water dispersing can be carried out in a usual manner, for example, by neutralizing the carboxyl group of the modified polyester resin with about 0.3 to 1.5 equivalents of a basic substance known per se as a neutralizing agent.

The basic compound used for neutralization can be the same neutralizing agent as indicated above in connection with thickening the aqueous dispersion (I) of the acrylic polymer fine particles.

CROSSLINKING AGENT (III)

The crosslinking agent (III) used in the composition of this invention includes an amino resin and a blocked polyisocyanate known per se which can form a crosslinked structure by reaction with active hydrogens of hydroxyl groups, etc. present in the resins of the aqueous dispersions (I) and (II). Especially, a melamine resin is preferable. In general, a hydrophilic melamine resin is preferable since it can form a coated film excellent in coating finish and durability without sagging and unevenness.

In order to additionally improve water resistance of the coated film, it is effective to use a hydrophobic melamine resin obtained by water-dispersing a hydrophobic melamine resin having a rate of solvent dilution of 0.1 to 20 relative to a water/methanol solvent mixture (35/65 in weight ratio) and a weight average molecular weight of 800 to 4,000 in the presence of a water-soluble resin. The conjoint use of it with a hydrophilic melamine resin is desirous to meet both finishing property and water resistance. The hydrophobic melamine resin/hydrophilic melamine resin ratio is advantageously 95-5/5-95, preferably 80-20/20-80.

The hydrophobic melamine resin is not particularly limited if satisfying the aforesaid conditions, and those shown in, e.g., U.S. Pat. No. 4,900,774 are available. To be specific, said hydrophobic melamine resin is a resin obtained by water-dispersing, in the presence of a water-soluble resin, a melamine resin modified with an alcohol such as methyl alcohol, ethyl alcohol, isopropyl alcohol, n-butyl alcohol, isobutyl alcohol, octyl alcohol, 2-ethylhexyl alcohol or benzyl alcohol, preferably an alcohol having 4 or more carbon atoms, more preferably, an alcohol having 4 to 7 carbon atoms, the amount of the ether group in the melamine resin being about 5 mols or less, preferably about 1.5 to about 3 mols per triazine ring. The water-soluble resin used as a dispersion stabilizer is a resin formed by neutralizing a carboxyl group-containing resin such as an acrylic resin, an alkyd resin, an epoxy resin or a urethane resin and making it water-soluble.

The rate of solvent dilution referred to here is an index to indicate solubility of the melamine resin in the hydrophilic solvent. The lower the rate of solvent dilution, the higher the hydrophobicity. Said rate of solvent dilution is measured by charging 2 g of the melamine resin in a 50 cc beaker, placing it on a paper with No. 5 types printed, then dropwise adding a water/methanol solvent mixture (35/65 weight ratio) at 25° C., and continuing the dropwise addition with stirring until the types are illegible. The amount (cc) of the solvent mixture added dropwise is divided by the amount of the melamine resin charged, and the resulting value (cc/g) is the rate of solvent dilution.

Meanwhile, the hydrophilic melamine resin is a relatively low-molecular-weight resin modified with an alcohol having a small number of carbon atoms, e.g., 4 or less carbon atoms, such as methyl alcohol, ethyl alcohol, propyl alcohol or butyl alcohol, said resin containing a polar group such as an imino group, a methylol group or the like. Examples of such a resin are Cymel 303, 325, 350 and 370 (trademarks for products of American Cyanamid Company).

COLOR PIGMENT (IV)

The color pigment used in this invention includes a metallic pigment and a color pigment ordinarily used in the field of paints. Examples of the metallic pigment are an aluminum flake, a copper bronze flake and a color mica powder. Examples of the color pigment are inorganic pigments such as titanium dioxide, iron oxide, chromium oxide, lead chromate and carbon black; and organic pigments such as phthalocyanine blue, phthalocyanine green, carbazole violet, anthrapyrimidine yellow, flavanthrone yellow, isoindoline yellow, indanthrone blue and quinacridone violet. They can be used either singly or in combination.

AQUEOUS COLOR PAINT COMPOSITION

In the aqueous color paint composition of this invention, the proportion of the aqeous dispersion (I) of acrylic polymer fine particles is usually 10 to 90% by weight, preferably 20 to 80% by weight based on the total solids content of the aqueous dispersion (I) of acrylic polymer fine particles and the modified polyester resin aqueous dispersion (II); the proportion of the modified polyester resin aqueous dispersion (II) is 90 to 10% by weight, preferably 80 to 20% by weight on the same basis. When the proportion of the former is less than 10% by weight, i.e., the proportion of the latter is more than 90% by weight, there is a tendency that the coated film easily sags and orientation of the aluminum pigment decreases. On the other hand, when the proportion of the former is more than 90% by weight, i.e., the proportion of the latter is less than 10% by weight, there is a likelihood that when the composition is rendered high-solid, smoothness of the coated film becomes poor and improvement in chipping resistance and non-sand recoatability of the coated film cannot be expected.

Further, in the composition of this invention, the proportion of the crosslinking agent (III) is usually 10 to 70 parts by weight, preferably 15 to 50 parts by weight per 100 parts by weight, as a solids content, in total of the aqueous solutions (I) and (II).

Still further, the proportion of the color pigment (IV) varies with the type and required color of the pigment used, but is usually 2 to 200 parts by weight, especially 3 to 150 parts by weight per 100 parts by weight, as a solids content, in total of the aqueous dispersions (I) and (II).

The composition of this invention can properly contain additives such as a UV absorber, a light stabilizer, a defoamer and a curing catalyst if required.

The aqueous color paint composition of this invention can be prepared, for example, by mixing and dispersing the aforesaid components (I) to (IV) in a manner known per se, and adding deionized water so that the solids content is adjusted to 10 to 45% by weight, preferably 20 to 40% by weight and viscosity to 800 to 5,000 cps/6 rmp, especially 200 to 3,000 cps/6 rpm (measured by a B-type viscometer).

The aqueous color paint composition of this invention can be used quite desirably as a base coat composition in the two-coat one-bake coating. For example, the composition of this invention is coated on a product being coated to a dry film thickness of about 5 to 50 microns via spray-coating. The coated product is then dried with air or hot air until the volatile content becomes about 25% by weight or less, and a clear topcoat is coated on the uncured product via static spray-coating until the dry film thickness becomes about 15 to 70 microns. After usual setting, the product is heated at about 120° to 160° C. for about 15 to 30 minutes. A cured coated film can thereby be formed. On this occasion, coatability is quite good, making it possible to provide a smooth coated film having beautiful appearance.

The clear topcoat used here can be a usual topcoat. Examples thereof are organic solvent dilution-type paints of an aminoalkyd resin, an acrylic resin, an aminoacrylic resin, an amino oil-free alkyd resin, a silicone polyester resin, a fluorine resin and a urethane resin. As the clear topcoat, a high-solid paint containing a small amount of the organic solvent is desirous from the aspects of environment, energy saving, etc. A powder paint is also available.

Available as the coated product are materials such as metals, plastics, and the like, which are subjected or not subjected to surface treatment, and these materials which are subjected to primer (an electrodeposition paint, etc.) coating and intermediate coating.

According to this invention, especially, the aqueous color paint composition is blended with the modified polyester resin in aqueous dispersion (II), with the result that even if the solids content in coating is 25 to 45% by weight to make the composition high-solid, coatability (two-stage coatability) is good and finish is provided with satisfactory smoothness of a coated film.

Moreover, since the composition of this invention has suitable pseudoplasticity or thixotropy, defects in coating, such as sagging, unevenness, etc. do not occur even under high humidity, and chipping resistance and non-sand recoatability of the coated film are excellent.

Under the circumstances, the composition of this invention is quite suitable as a high-solid base coating composition when coating an outside plate, etc. of automobiles, two-wheelers, electric appliances, etc. requiring beautiful appearance by a two-coat one-bake method. Especially, decorative coating such as metallic coating can be conducted with good workability and satisfactory finish.

The following Production Examples, Examples and Comparative Example illustrate this invention more specifically. In said Examples, "parts" and "%" are all by weight unless otherwise indicated.

PRODUCTION EXAMPLE 1

Production of an aqueous dispersion (I)-a of acrylic polymer fine particles

A reaction vessel was charged with 70 parts of deionized water, 2.5 parts of 30% "Newcol 707SF" (a trademark for a surface active agent of Nippon Nyukazai K.K.) and 1 part of the following monomer mixture (1), and they were mixed with stirring in a nitrogen stream, followed by adding 3 parts of 3% ammonium persulfate at 60° C. After the temperature was elevated to 80° C., a monomer emulsion comprising 79 parts of the monomer mixture (1), 2.5 parts of 30% "Newcol 707SF", 4 parts of 3% ammonium persulfate and 42 parts of deionized water was added to the reaction vessel with a metering pump over a period of 4 hours. After the addition, ageing was conducted for 1 hour.

Further, a monomer emulsion comprising 20.5 parts of the following monomer mixture (2), 4 parts of a 3% ammonium persulfate aqueous solution and 30 parts of deionized water was added to the reaction vessel with a metering pump over a period of 1.5 hours. After the addition, ageing was conducted for 1 hour. Then, the reaction mixture was cooled to 30° C. and filtered with a 200-mesh nylon cloth. To this was further added deionized water, and the pH was adjusted to 7.5 with dimethylaminoethanol. There resulted an aqueous dispersion (I)-a of acrylic polymer fine particles having an average particle size of 0.1 micron and a nonvolatile content of 40%.

| | parts |
|---|---|
| Monomer mixture (1) | |
| Methyl methacrylate | 55 |
| Styrene | 10 |
| n-Butyl acrylate | 9 |
| 2-Hydroxyethyl acrylate | 5 |
| 1,6-Hexanediol diacrylate | 1 |
| Monomer mixture (2) | |
| Methyl methacrylate | 5 |
| n-Butyl acrylate | 7 |
| 2-Ethylhexyl acrylate | 5 |
| Methacrylic acid | 3 |
| 30% "Newcol 707SF" | 0.5 |

PRODUCTION EXAMPLE 2

Production of an aqueous dispersion (I)-b of acrylic polymer fine particles

Forty parts of deionized water and 1 part of 30% "Newcol 707SF" were added to the reaction vessel and mixed with stirring. After the temperature was elevated to 80° C., a monomer emulsion comprising 100 parts of the following monomer mixture, 4 parts of 30% "Newcol 707SE", 4 parts of 3% ammonium persulfate and 100 parts of deionized water was added to the reaction vessel over a period of 4 hours. After the addition, ageing was conducted for 1 hour. The reaction mixture was then cooled to 30° C., and filtered with a 200-mesh nylon cloth. To this was added deionized water, and pH was adjusted to 7.5 with dimethylaminoethanol. There resulted an aqueous dispersion (I)-b of acrylic polymer fine particles having an average particle size of 0.1 micron and a nonvolatile content of 40%.

| Monomer mixture | parts |
|---|---|
| Methyl methacrylate | 60 |
| Styrene | 10 |
| n-Butyl acrylate | 16 |
| 2-Ethylhexyl acrylate | 5 |
| 2-Hydroxyethyl actylate | 5 |
| Methacrylic acid | 3 |
| 1,6-Hexanediol diacrylate | 1 |
| Total: | 100 |

PRODUCTION EXAMPLE 3

Production of an aqueous dispersion (II)-a of a modified polyester resin

| | parts |
|---|---|
| Ethylene glycol | 9.2 |
| Trimethylolpropane | 20.2 |
| Tetrahydroxyphthalic anhydride | 13.5 |
| Phthalic anhydride | 26.1 |
| Coconut oil fatty acid | 31.0 |

The above components were charged in a reaction vessel and reacted at 230° C. for 9 hours to obtain an alkyd resin having an acid value of 15.0, a hydroxyl value of 46.0 and an oil length of 33.5%. To this were further added 4 parts of glycidyl methacrylate and 0.1 part of dimethylaminoethanol as a catalyst. The reaction was run at 130° C., and the reaction mixture was then diluted with butyl cellosolve to obtain an alkyd resin solution having a solids content of 60%. One hundred parts of the alkyd resin solution were charged into another reaction vessel and held at 120° C. Subsequently, a mixture of the following formulation was added dropwise over a period of 3 hours, and benzoyl peroxide as an additional catalyst was then added dropwise, followed by conducting the reaction.

| | parts |
|---|---|
| Styrene | 24 |
| n-Butyl acrylate | 16.8 |
| 2-Hydroxyethyl acrylate | 12 |
| Acrylic acid | 7.2 |
| Benzoyl peroxide | 1.8 |

The thus obtained reaction product was neutralized with dimethylaminoethanol, and deionized water was added. There resulted an aqueous dispersion (II)-a of a 30% modified polyester resin.

PRODUCTION EXAMPLE 4

Production of a modified polyester resin aqueous dispersion (II)-b

| | parts |
|---|---|
| Ethylene glycol | 29.3 |
| Trimethylolethane | 6.3 |
| Adipic acid | 38.3 |
| Isophthalic acid | 26.1 |

The above components were charged into a reaction vessel, and the reaction was conducted at 230° C. for 8 hours to obtain a polyester resin having an acid value of 10 and a hydroxyl value of 183. To this were further added 1.5 parts by weight of an isophorone diisocyanate/2-hydroxyethyl acrylate adduct (mol ratio 1/1), and the reaction was run at 120° C. for 1 hour. The reaction product was diluted with butyl cellosolve to provide a polyester resin solution having a solids content of 60%. One hundred parts of the polyester resin solution were charged into another reaction vessel and maintained at 120° C. Then, a mixture of the following formulation was added dropwise over a period of 3 hours, and azobisisobutylonitrile as an additional catalyst was added. After the reaction was terminated, the reaction mixture was neutralized with dimethylaminoethanol, and deionized water was added to obtain a 30% modified polyester resin aqueous dispersion (II)-b.

| | parts |
|---|---|
| Styrene | 8 |
| Methyl methacrylate | 4 |
| 2-Ethylhexyl acrylate | 18 |
| 2-Hydroxyethyl acrylate | 4 |
| Acrylic acid | 6 |
| Azobisisobutylonitrile | 0.8 |

EXAMPLE 1

A mixture of the following formulation was stirred with a disper mixer to obtain an aqueous color paint (1) having viscosity of 1,500 mPas measured by a B-type viscometer No. 3 rotor and a solids content of 30%.

| | parts |
|---|---|
| Aqueous dispersion (I)-a of acrylic polymer fine particles in Production Example 1 | 75 |
| Modified polyester resin aqueous dispersion (II)-a in Production Example 3 | 150 |
| Uban 28-60*1 | 25 |
| Cymel*2 | 11 |
| Primal ASE-60*3 | 1 |
| Dimethylaminoethanol | 0.5 |
| Aluminum paste | 20 |
| Butyl cellosolve | 25 |
| Deionized water | 250 |

*1 A melamine resin aqueous dispersion formed by charging a reaction vessel with Uban 28-60 (a trade-mark for a hydrophobic melamine resin of Mitsui Toatsu Chemicals, Inc., a nonvolatile content 60%, a rate of solvent dilution 0.4, a weight average molecular weight 3,000 to 4,000) such that the solids content becomes 25 parts, adding thereto 20 parts of a 50% acrylic resin aqueous solution obtained by neutralizing with an alkali an acrylic resin (an acid value 48) resulting from copolymerization of 26 parts of n-butyl acrylate, 47 parts of methyl methacrylate, 10 parts of styrene, 10 parts of 2-hydroxyethyl methacrylate and 6 parts of acrylic acid and dissolution of said resin in water, and gradually adding deionized water to the mixture to make the solids content 60%.

*2 A trademark for a hydrophilic methyl-etherified melamine resin solution with a solids content of 88% made by Mitsui Cyanamid K.K.

*3 A trademark for an acrylic resin emulsion (a thickening agent) with a solids content of 28% made by Nippon Acryl Kagaku K.K.

EXAMPLE 2

Production of an aqueous color paint

Example 1 was repeated except that the polyester resin aqueous dispersion (II)-a was replaced with the modified polyester resin aqueous dispersion (II)-b in Production Example 4. There resulted an aqueous color paint (2) having viscosity of 1,500 mPas and a solids content of 30%.

EXAMPLE 3

A mixture of the following formulation was stirred with a disper mixer to obtain an aqueous color paint (3) having viscosity of 1,200 mPas measured by a B-type viscometer No. 3 rotor and having a solids content of 30%.

| | parts |
|---|---|
| Aqueous dispersion (I)-b of acrylic polymer fine particles | 25 |
| Polyester resin aqueous dispersion (II)-a | 217 |
| Uban 28-60*1 | 25 |
| Cymel 370*2 | 11 |
| Primal ASE-60*3 | 2 |
| Dimethylaminoethanol | 0.7 |
| Aluminum paste | 20 |
| Butyl cellosolve | 25 |
| Deionized water | 210 |

Note: *1, *2, *3 are described above.

EXAMPLE 4

Example 1 was repeated except that Uban 28-60 was replaced with Cymel 325 (a trademark for a hydrophilic melamine resin of Mitsui Cyanamid K.K.). There was obtained an aqueous color paint (4) having viscosity of 2,000 mPas and a solids content of 30%.

COMPARATIVE EXAMPLE 1

A mixture of the following formulation was stirred with a disper mixer to obtain an aqueous color paint having viscosity of 2,000 mPas measured by a B-type viscometer No. 3 rotor and a solids content of 30% (control 1) for comparison.

| | parts |
|---|---|
| Aqueous dispersion (I)-a of acrylic polymer fine particles | 188 |
| Uban 28-60*1 | 25 |
| Cymel 370*2 | 11 |
| Primal ASE-60*3 | 1.5 |
| Dimethylaminoethanol | 1.0 |
| Aluminum paste | 20 |
| Butyl cellosolve | 25 |
| Deionized water | 290 |

A test for properties of a coated film was run using the aqueous color paints (1) to (4) and (control 1) as paints for base coat. The results are shown in Table 1.

PRODUCTION OF A COATED PLATE

An epoxy resin-type cationically electrodepositable paint ("Elecron No. 9200", a trademark for a product of Kansai Paint Co., Ltd.) was coated on a chemically treated dull steel plate (a dry film thickness 25 micrometers), and heat-cured at 170° C. for 30 minutes. Subsequently, "Luga-Bake AM" (a trademark for a polyester resin/melamine resin automobile paint of Kansai Paint Co., Ltd.) was coated to a dry film thickness of 30 micrometers as an intermediate coat, and the coated plate was baked at 140° C. for 30 minutes. The coated surface was then polished with a #400 sand paper and wiped with benzine. The thus treated plate was used as the product being coated.

The product being coated was coated with each of the paints (1) to (4) and (control-1) for aqueous color base coat, then dried at 80° C. for 10 minutes, and coated with a clear topcoat ("Magicron", a trademark for an acryl/melamine organic solvent-type paint of Kansai Paint Co., Ltd.). Booth conditions in coating were 25° C. and 79% RH. A dry film thickness of the base coat was 15 to 20 micrometers, and that of the clear topcoat was 35 to 45 micrometers. The thus obtained product was left to stand at room temperature for 10 minutes and baked at 140° C. for 30 minutes. In the test for recoatability, baking was conducted first at 160° C. for 30 minutes, and then at 120° C. for 30 minutes.

TEST METHODS (*1) Unevenness: Metallic unevenness of the coated film was measured and evaluated with the following grades.

◎: Unevenness is not observed.
○: Unevenness is somewhat observed.
X: Unevenness is notably observed.

(*2) Image clarity: Measured with an imag. clarity meter manufactured by Suga Shikenki K.K. The figure in the table is an ICM value within the range of 0 to 100%. The higher the value, the better the image clarity. When the ICM value is more than 80, image clarity is quite excellent.

(*3) Metallic feeling: Brightness and whiteness were observed from the front and evaluated with the following grades.

◎: Brightness and whiteness are observed.

Δ: Brightness is absent and whiteness is poor.

(*4) Recoatability: The same base paint and clear paint as in Examples and Comparative Example were coated on a surface of a film and baked at 120° C. for 30 minutes to obtain a coated film. Crosscuts were applied to the coated film with a cutter knife. A cellophane adhesive tape was adhered to the coated surface, and rapidly peeled off. Then, adhesion between the coated films (clear coat film/base coat film) of the first and second peelings was evaluated with the following grades.

◎: No peeling is observed.

○: Peeling is somewhat observed.

Δ: Peeling is notably observed.

(*5) Chipping resistance

1. Tester: Stone scattering tester JA-400 Model (Gravelometer) [a trademark for a machine of Suga Shikenki K.K.]
2. Stone being jetted: Broken stone having a diameter of about 15 to 20 mm
3. Volume of the stone being jetted: about 500 ml
4. Jet air pressure: about 4 kg/cm$^2$
5. Test temperature: about −20° C.

A test piece was mounted on a test piece holding base. About 500 ml of broken stones were jetted against the test piece at a jet air pressure of about 4 kg/cm$^2$, and the condition of the coated surface was then visually observed and evaluated with the following grades.

Condition of the coated surface:

◎ (good): A flaw due to shock is observed very slightly on part of the topcoat film without peeling of the electrodeposition coated film.

○ (somewhat bad): A flaw due to shock is observed slightly on the top coat and intermediate coat films and peeling is observed here and there on the electrodeposition coated film.

Δ (bad): Considerable parts of the top coat and intermediate coat films are peeled off and peeling is also observed on the shocked portions and the surroundings thereof.

(*6) Water resistance: The coated film dipped in hot water of 40° C. for 240 hours and washed with water was observed and evaluated with the following grades.

○: No change.

Δ: Gloss slightly decreases.

TABLE 1

| | | Examples | | | | Comparative Example |
|---|---|---|---|---|---|---|
| | | 1 | 2 | 3 | 4 | 1 |
| Aqueous color paint | | (1) | (2) | (3) | (4) | (4) |
| Appearance and properties of the coated film | Unevenness (*1) | ○ | ○ | ○ | ◎ | X |
| | Image clarity (*2) | 83 | 84 | 81 | 85 | 68 |
| | Metallic feeling (*3) | ○ | ○ | ○ | ◎ | Δ |
| | Recoatability (*4) | ○ | ◎ | ◎ | ○ | Δ |
| | Chipping resistance (*5) | ○ | ◎ | ◎ | ○ | Δ |
| | Water resistance (*6) | ○ | ○ | ○ | Δ | Δ |

What we claim is:

1. An aqueous color paint composition comprising (I) an aqueous dispersion of acrylic polymer fine particles, (II) a modified polyester resin aqueous dispersion obtained by neutralizing, with a basic substance, a modified polyester resin which has an acid value of 80 to 200 and a hydroxyl value of 30 to 300, and which is formed by polymerizing (a) an ethylenically unsaturated group-containing polyester resin which is obtained by reacting a polyester resin containing a carboxyl group and a hydroxyl group with at least one monomer selected from the group consisting of (1) an epoxy group-containing ethylenically unsaturated monomer, (2) an isocyanate group-containing ethylenically unsaturated monomer and (3) an acid anhydride group-containing polymerizable unsaturated monomer, and (b) a mixture of an ethylenically unsaturated carboxylic acid and another copolymerizable unsaturated monomer, and dispersing the resulting resin in an aqueous dispersion medium, (III) a melamine resin, and (IV) a color pigment.

2. The composition of claim 1 wherein the acrylic polymer fine particles of the aqueous dispersion (I) have an average particle size of 0.02 to 1 micrometer.

3. The composition of claim 1 wherein the acrylic polymer fine particles of the aqueous dispersion (I) are crosslinked.

4. The composition of claim 1 wherein the modified polyester resin of the aqueous dispersion (II) has an acid value of 8 to 150.

5. The composition of claim 1 wherein the modified polyester resin of the aqueous dispersion (II) has a hydroxyl value of 40 to 200.

6. The composition of claim 1 wherein the modified polyester resin of the aqueous dispersion (II) has a number average molecular weight of 500 to 15,000.

7. The composition of claim 1 wherein the unsaturated monomers (1) to (3) are reacted in a proportion of 0.2 to 5 mols per molecule of the polyester resin containing the carboxyl group and the hydroxyl group.

8. The composition of claim 1 wherein the ethylenically unsaturated carboxylic acid/other copolymerizable unsaturated monomer weight ratio in the monomer mixture (B) is 2/98 to 30/70.

9. The composition of claim 1 wherein the ethylenically unsaturated carboxylic acid is (meth)acrylic acid.

10. The composition of claim 1 wherein the other copolymerizable unsaturated monomer is at least one monomer selected from the group consisting of an alkyl or cycloalkyl (meth)acrylate, a vinyl aromatic compound, (meth)acrylonitrile, and a hydroxyalkyl (meth)acrylate.

11. The composition of claim 1 wherein the polyester (A) and the monomer mixture (B) are polymerized at a (A)/(B) weight ratio of 20/80 to 90/10.

12. The composition of claim 1 wherein the melamine resin is a mixture of a hydrophilic melamine resin and a hydrophobic melamine resin.

13. The composition of claim 1 wherein the color pigment (IV) is selected from the group consisting of a metallic pigment and an inorganic or organic color pigment.

14. The composition of claim 1 wherein based on the total solids content of the aqueous dispersion (I) of acrylic polymer fine particles and the modified polyester resin aqueous dispersion (II), the proportion of the aqueous dispersion (I) is 10 to 90% by weight and the proportion of the aqueous dispersion (II) is 90 to 10% by weight.

15. The composition of claim 1 wherein the proportion of the melamine resin (III) is 15 to 70 parts by weight per 100 parts by weight, as a solids content, in total of the aqueous dispersions (I) and (II).

16. The composition of claim 1 wherein the proportion of the color pigment (IV) is 2 to 200 parts by weight per 100 parts by weight, as a solids content, in total of the aqueous dispersions (I) and (II).

17. The composition of claim 1 wherein the solids content is 10 to 45% by weight.

18. The composition of claim 1 wherein viscosity is 800 to 5,000 cps/6 rpm measured by a B-type viscometer.

19. A coating method which comprises coating the aqueous color paint composition of claim 1 as a base coat composition on a product being coated, coating a clear topcoat on the uncured coated product, and heat-curing both the coated films at the same time.

20. A coated article which is coated with the aqueous color paint composition of claim 1.

* * * * *